United States Patent [19]
Khan

[11] 3,863,956
[45] Feb. 4, 1975

[54] SHOCK ABSORBING BUMPER AND HITCH

[75] Inventor: Shahid R. Khan, Urbana, Ill.

[73] Assignee: The Scott & Fetzer Company, Cleveland, Ohio

[22] Filed: Feb. 28, 1974

[21] Appl. No.: 446,600

[52] U.S. Cl. .............................. 280/483, 280/500
[51] Int. Cl. ............................................ B60d 3/00
[58] Field of Search .......... 280/500, 501, 483, 486; 293/85, 86

[56] References Cited
UNITED STATES PATENTS

| | | | |
|---|---|---|---|
| 3,501,170 | 3/1970 | Davalle | 280/500 |
| 3,547,469 | 12/1970 | Sancioni | 280/483 |
| 3,712,657 | 1/1973 | Gallina | 293/86 |

*Primary Examiner*—Robert R. Song
*Attorney, Agent, or Firm*—McNenny, Farrington, Pearne & Gordon

[57] ABSTRACT

A shock absorbing bumper unit for dampening and cushioning the loads applied to a motor vehicle by a towed trailer is provided. A trailer-hitch ball or similar towing connector member is fixed to the bumper which is connected to the motor vehicle frame for resilient, relative movement with respect thereto by a pair of telescoping bracket assemblies. Each of the bracket assemblies includes a female bracket element fixed to the frame and an associated, reciprocably movable male bracket element extending therefrom for supporting the bumper. Draw rods tie the associated bracket elements to one another, and the reciprocable movement of the male bracket elements together with the supported bumper is resisted by pairs of resiliently compressible sleeves fitted over each of the draw rods and entrapped within the bracket assemblies.

12 Claims, 3 Drawing Figures

PATENTED FEB 4 1975

3,863,956

SHOCK ABSORBING BUMPER AND HITCH

BACKGROUND OF THE INVENTION

The present invention relates to motor vehicle bumper hitch apparatus and, more particularly, to a shock absorbing bumper unit for cushioning or dampening the forces applied to a motor vehicle by a towed trailer or the like. A trailer-hitch ball or other suitable connecting structure is fixed to the bumper, and the bumper is resiliently mounted to the frame of the motor vehicle for relative, longitudinal movement with respect thereto.

The prior art discloses the resilient mounting of trailer hitches by means of a single mounting cylinder comprising a coiled spring and piston structure. The spring biased piston structure has one end thereof fixed to the vehicle frame and it extends rearwardly beyond the vehicle bumper. The protruding end of the piston structure is provided with a towing connecting structure. In some instances, the rear bumper is supported by multiple coiled spring and piston cylinders as shown in U.S. Pat. No. 3,547,469.

SUMMARY OF THE INVENTION

In accordance with the present invention, the shock absorbing bumper unit is adapted to be resiliently mounted to the frame of a motor vehicle by means of spaced bracket assemblies. Each of the bracket assemblies includes telescoping bracket elements secured to one another by a draw rod extending through resilient sleeve means arranged to resist relative movement of the bracket elements. The bumper is supported by the bracket assemblies and a towing-connector structure is fixed to the bumper.

In the illustrated embodiment, the telescoping bracket elements include a female bracket element fixed to the vehicle frame and a relatively movable, male bracket element which supports the bumper. The resilient sleeve means comprise a pair of elastomeric tubes which encircle the draw rod and are confined within the bracket elements. The tubes are arranged for axial elastic deformation for purposes of dampening the forces applied to the hitch before they are transmitted to the vehicle frame.

The use of elastomeric sleeves has been found to provide shock absorbing and dampening characteristics which are superior to those of the prior art coiled spring structures. The elastomeric materials have also been found to provide high cycle life values and acceptable performance over the entire operating temperature range resulting from various weather conditions. The use of urethane elastomeric materials to form the sleeves has been found to be particularly satisfactory.

The shock absorbing and dampening characteristics of the sleeves are a function of the particular elastomeric material selected to form them as well as the absolute sizes thereof. In addition, the ultimate deformation and cushioning characteristics of the sleeves are also a function of the degree to which they are confined within the bracket elements. More particularly, the resistance to deformation of the sleeve may be altered by limiting or restricting the movement of the elastomeric material within chambers defined by the bracket elements.

The shock absorbing bumper unit of the present invention effectively increases the towing capacity of a motor vehicle by reducing the maximum forces applied to the vehicle during a towing operation. In achieving this end, the bumper unit utilizes the elastomeric sleeves as an energy storing means and the vehicle is only exposed to the net forces resulting from the cyclic, oppositely directed loads encountered in a typical towing operation. The towing capacity is increased since the vehicle including the differential, transmission and suspension as well as other parts which are susceptible to damage upon sudden loading are only exposed to net forces within the energy storing period of the elastomeric sleeves. The frequency of the transmitted forces is correspondingly reduced to provide a further reduction in the strain on the transmission and the differential.

The increase in towing capacity may be particularly evident in off the road or rough terrain towing applications such as those encountered in farming and construction and, especially, where liquids are being transported and the momentum thereof must be contended with when the liquid container is partially full. In such applications, the magnitude of the forces applied to the vehicle may be reduced by as much as 70 percent when the shock absorbing bumper unit of the present invention is employed.

In comparison with the prior art single cylinder hitch arrangement, the unit of the present invention does not result in an undesirably protruding hitch and it effectively distributes the loads to separate portions of the frame. Moreover, the present invention efficiently combines the advantages of a resilient hitch and a collapsable, "crash effect" bumper since the entire bumper is mounted for longitudinal, relative movement with respect to the vehicle frame.

In comparison with coiled spring devices generally, the resilient sleeves of the present invention do not tend to oscillate but rather provide a dampening shock absorber function. Therefore, the transmission of vibrations to the vehicle frame is substantially reduced. The reduction in transmitted vibrations results in the motor vehicle having smoother and more comfortable riding characteristics with corresponding improvements in the road handling or driving characteristics.

The prior art spring devices are characterized by a spring rate wherein the ratio of the applied force to the resulting deflection is constant. In contrast with such spring devices, the elastomeric sleeves of the present invention provide an exponential relationship between the applied forces and deflection. This exponential relationship in combination with the inherent dampening characteristics of an elastomeric material provide an exceptionally effective shock absorber which is well suited for the relatively large dynamic forces encountered in towing applications. For example, longitudinal forces on the order of 40,000 lbs. as measured at the bumper hitch have been observed in towing a 20,000 lb. gross trailer weight over irregular railroad tracks at 20 to 25 m.p.h. The longitudinal forces are considered to be the most severe loads developed in a towing operation and a controlling factor in hitch design.

The resilient sleeves of the present invention do not require lubrication maintenance as do the prior art coiled spring structures. Contrarily, the sleeves are substantially maintenance free and, therefore, they are not subject to premature failure simply due to improper maintenance. Further, the complete confinement of the sleeves within the bracket elements also serves to protect them against external damage including weather effects.

Aside from premature failures resulting from improper maintenance, coiled springs are also subject to early failure resulting from shattering of the metal spring upon severe shock loads. This type of failure is also eliminated by the elastomeric sleeves of the present invention.

DETAILED DESCRIPTION OF THE DRAWINGS

Figure 1:
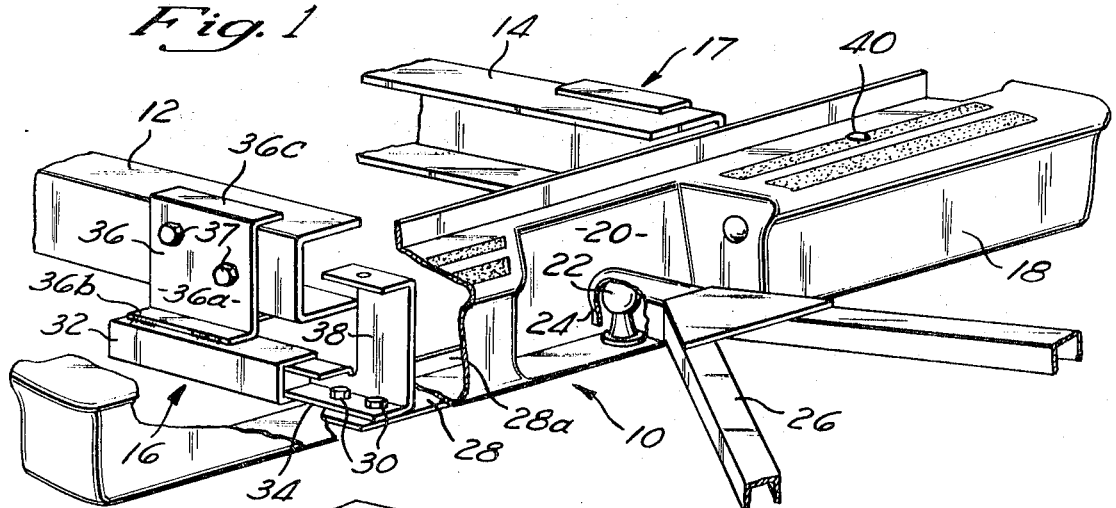
FIG. 1 is a perspective view with parts broken away of a shock absorbing bumper unit secured to the frame rails of a motor vehicle by associated bracket assemblies in accordance with the present invention.

Referring to the drawings in greater detail, a shock absorbing bumper unit 10 is resiliently mounted on the frame rails 12 and 14 of a motor vehicle (not shown). The illustrated bumper unit 10 is designed for use with a small truck-like vehicle such as a "pick-up" truck which includes a frame structure having rearwardly extending frame rails such as the frame rails 12 and 14 for supporting a bumper which extends across the rear end of the vehicle.

The shock absorbing bumper unit 10 is resiliently secured to the frame rails 12, 14 by a pair of bracket assemblies 16 and 17. Accordingly, the bumper unit is mounted to the frame at spaced locations for purposes of evenly distributing the loads applied by a towed trailer or other vehicle.

The bumper unit 10 includes a bumper or bumper shell 18 which replaces the original bumper shell provided with the motor vehicle and which extends across the rear width of the motor vehicle. The bumper shell 18 includes a centrally located recess 20 having a trailer-hitch ball 22 mounted therein for connection with a socket 24 of a towing yoke 26 of a trailer (not shown). Of course, other types of towing hitch connectors such as a tongue and pin connector may be employed, and all such connectors may be conveniently disposed within the recess 20. In addition to locating the towing-connector structure within a recess, it is also disposed substantially within the plane of relative movement of the bracket assemblies to minimize the development of torque loads in the assemblies as will become more apparent below.

The bumper unit 10 also includes a draw bar 28 which structurally reinforces the bumper shell and cooperates therewith to transmit the towing forces to the bracket assemblies 16 and 17. Accordingly, the mounting stem of the trailer-hitch ball 22 extends through the bumper shell and it is secured to both the lower face of the recess 20 of the bumper shell 18 and the draw bar 28. The opposite ends of the draw bar 28 are secured to the adjacent bracket assemblies 16 and 17 by means of bolts 30 as shown with respect to the assembly 16.

The draw bar 28 includes a vertically extending leg 28a for added reinforcement and resistance to vertical loads applied to the trailer-hitch ball 22 and the bumper unit 10 by a towed vehicle. In addition to the generation of such vertical loads upon traversing rough terrain, it should be appreciated that conventional trailer design imposes a predetermined downward load on the hitch to lessen the "fish-tailing" or swaying of the trailer especially during cornering. This predetermined load is equal to about 10 to 15 percent of the gross trailer weight.

The use of a separate draw bar may be obviated in some instances by integrally forming the same with the bumper shell. For example, the entire bumper shell 18 or appropriate portions thereof may simply be formed of a heavier gage metal.

The bracket assemblies 16 and 17 are identical but for their mirror image mounting structure for purposes of connection between the frame rails 12, 14 and the bumper shell 18. Accordingly, only the structure of assembly 16 is discussed in detail, it being understood that the assembly 17 is identical but for the reversal of the frame and bumper connections.

The bracket assembly 16 includes a female bracket element 32 having a hollow configuration for receipt of a correspondingly shaped male bracket element 34. The bracket element 32 is secured to the frame rail 12 by means of a mounting plate 36. The mounting plate 36 has a vertically disposed portion 36a which is bolted to the bight or connecting web of the U-shaped frame rail 12 by bolts 37. The mounting plate is secured to the female bracket element by means of a laterally, outward projecting leg 36b which is welded to the upper surface of the female bracket element.

The mounting plate 36 also includes a pair of laterally, inward projecting legs 36c and 36d which overlie portions of the opposed legs of the U-shaped frame rail 12. The legs 36c, 36d stabilize the connection of the bracket assembly to the frame rail and provide added resistance to the rotational movement of the bracket assembly relative to the frame which tends to occur upon vertical loading of the trailer-hitch ball.

The rearward end of the male bracket element 34 terminates in a U-shaped mounting flange 38. As shown in FIG. 1, the lower leg of the mounting flange is secured to the draw bar 28 and the bumper shell 18 by means of bolts 30. The upper leg of the mounting flange is secured to the bumper shell by means of a bolt 40 as shown with respect to the bracket assembly 17.

The female bracket element may have a generally rectangular cross-section and it includes a forward end wall 42 which is welded to the female bracket. The male bracket 34 includes a penetrating portion comprising a channel which may have a rectangular, U-shaped configuration which is sized to be received within the female bracket 32 in telescoping relationship. The penetrating portion of the male bracket 34 terminates at a forward end wall 44 which is welded to the male bracket. The forward end walls 42, 44 are respectively provided with clearance bores 42a and 44a for receiving a draw rod or assembly bolt 46 for tying the two bracket elements together. Accordingly, the forward end of the draw rod 46 is threadedly engaged with a nut 48.

Figure 3:
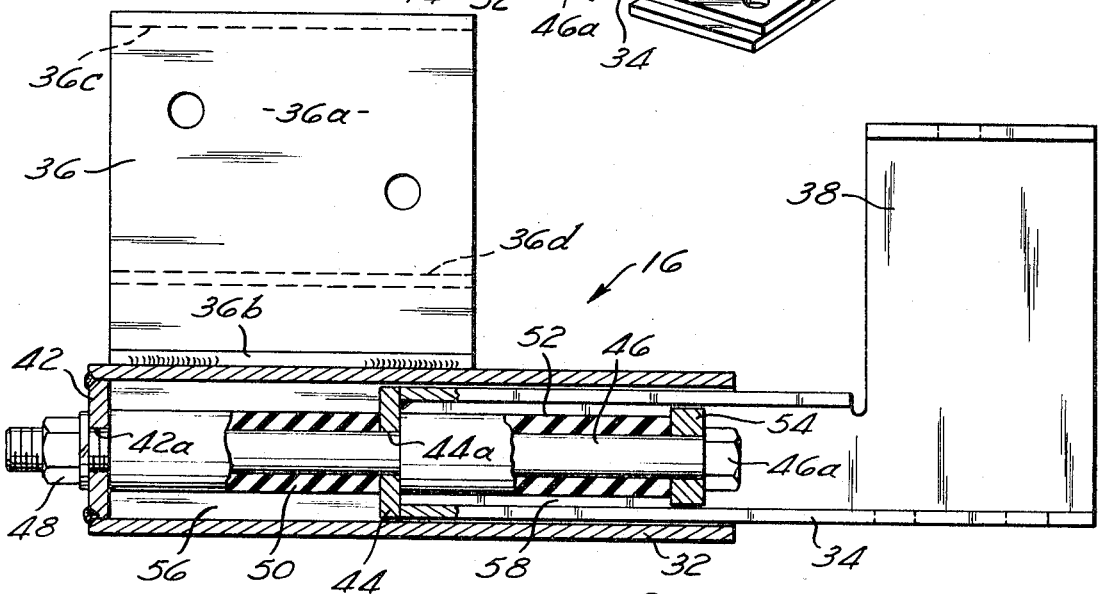
FIG. 3 is an elevational view on a still larger scale and partially in section of the bracket assembly shown in FIG. 2 in an unloaded condition with parts broken away and omitted.

The bracket assembly is shown in an unloaded condition in FIG. 3, and the portion of the draw rod 46 between the forward walls 42, 44 is enclosed within a forward elastomeric sleeve 50. A rearward elastomeric sleeve 52 encloses the portion of the draw rod 46 between the wall 44 and a sleeve retainer 54 disposed adjacent the head 46a of the draw rod. Accordingly, the elastomeric sleeves 50, 52 axially, resiliently resist relative movement of the bracket elements 32 and 34 as described below in greater detail.

Each of the sleeves 50, 52 may have a cylindrical, tubular configuration including a central bore having an inside diameter substantially equal to the outside diameter of the enclosed portion of the draw rod 46. The sleeves may be firmly retained in their axial positions without significant axial preloading by tightening the nut 48 upon assembly of the bracket elements 32 and 34.

Figure 2:
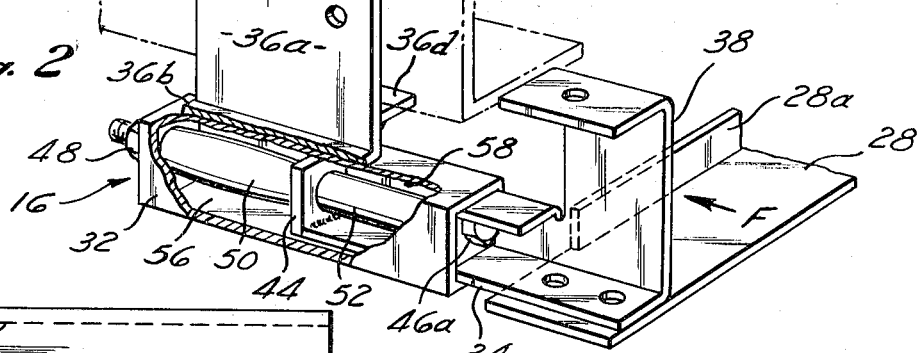
FIG. 2 is a perspective view on an enlarged scale of one of the bracket assemblies shown in FIG. 1 in a forwardly loaded condition with parts broken away for purposes of illustration.

Referring to FIG. 2, the bracket assembly 16 is shown in a loaded condition with a longitudinal force applied in the direction of the arrow F. The application of such a longitudinally directed force may result from braking the motor vehicle or whenever the towed trailer tends to overrun the towing vehicle. Similarly, such a force would be generated by a rear end impact as well as the backing of the motor vehicle into a stationary dock or the like.

Upon application of a force in the direction of the arrow F, the forward penetrating movement of the male bracket 34 is resisted by the axial compression of the sleeve 50. Specifically, the sleeve 50 is axially driven forward by the wall 44 of the male bracket and it is compressed against the wall 42 of the female bracket. As the sleeve is compressed, it bulges radially outward from the draw rod 46 along its intermediate axial length.

The resilient deformation of the sleeve 50 is initially provided by the bulging of its central portion as a result of the axial loading of the ends of the sleeve as indicated above. When the magnitude of the force F becomes great enough, the radial bulging of the sleeve and its deformation are affected by its confinement within the bracket element 32. Specifically, the sleeve 50 is contained within a forward chamber 56 defined by the adjacent surfaces of the end walls 42, 44 and the interior surfaces of the bracket element 32 disposed between the end walls. Accordingly, the sleeve 50 is both axially and radially confined and deformed within the chamber 56 in a maximum loading condition.

The penetration of the male bracket element 34 is ultimately limited by the engagement of the draw bar 28 with the female bracket element 32. In the illustrated embodiment, the draw bar is arranged to engage the female bracket element after the forward sleeve 50 has been compressed to about 50 percent of its original axial length.

Upon loading the bracket assembly with a longitudinal force in a direction opposite to that of the force F, the rearward sleeve 52 is compressed between the rearward surface of the wall 44 and the sleeve retainer 54. The rearward sleeve is confined within a rearward chamber 58 defined by the adjacent surfaces of the wall 44 and sleeve retainer 54 together with the interior surfaces therebetween of the bracket elements 32 and 34.

The maximum withdrawal of the male bracket element 34 is limited by the confinement of the rearward sleeve 52 within the chamber 58. The chamber is designed to permit about a 50 percent reduction in the axial length of the sleeve upon maximum withdrawal of the male bracket.

It should be appreciated that the dampening characteristics of the resilient sleeves may be altered by varying the volume of the chambers within which they are contained. Similarly, the overall resistance to forward and rearward movement of the male bracket 34 may be varied by the use of differently sized chambers. For example, the volume of the chamber 58 is less than that of the chamber 56 and the resistance to rearward movement of the male bracket is greater than the resistance to the forward movement of the bracket.

The shock absorbing and dampening characteristics of the resilient sleeves are primarily a function of the resilient material selected to form them. As previously indicated, urethane materials have been found to have particularly satisfactory shock absorbing characteristics and durability as reflected by successful cyclic loading tests of one million cycles at up to 5 cycles/sec. and approximately 11 percent axial deflection per cycle. For example, a commercially available cast urethane elastomer produced by the Armstrong Cork Company and designated as "Urethane PO-652" has proven to be highly successful in the bumper unit. This is a polyester urethane elastomer having a Shore A hardness value of 88 to 98 (ASTM D2240-64T) and a 25 percent compression-deflection value of 1,800 to 2,000 psi. (ASTM D575-46, Method A).

If it is desired to provide a bumper unit with a somewhat "softer" cushioning characteristic, Armstrong's "Urethane PO-650" may be employed. This is also a polyester urethane elastomer, and it has a Shore A hardness value of 74 to 88 and a 25 percent compression-deflection value of 900 to 1,100 psi. as determined in accordance with the above ASTM tests.

The bracket assembly and resilient sleeve members of the bumper unit of the present invention provide a structurally efficient towing arrangement in that they require a minimum amount of space compared to prior art structures and provide a relatively high towing capacity as well as a crash effect bumper. For example, the illustrated unit can tow with a gross trailer weight of up to 24,000 lbs. when fitted with 4½ inch long sleeves having an outside diameter of 1⅜ inches and an inside diameter of ¾ of an inch. Moreover, the bumper unit can withstand a 5 m.p.h. impact in accordance with Department of Transportation specification "NHTSA 215" (vehicle weight 3,500 lbs).

As shown by the illustrated embodiment, the shock absorbing bumper unit of the present invention employs a simple bolt-on installation which requires no special modifications of the vehicle frame or relocation of the spare tire in "pick-up" truck applications. In addition, the elastomeric sleeves may be readily replaced so as to essentially rebuild the unit by simply disconnecting the draw rod or assembly bolt 46 and removing the bumper shell together with the male bracket 34 from the female bracket 32.

The invention is not restricted to the slavish imitation of each and every one of the details described above, which have been set forth merely by way of example with the intent of most clearly setting forth the teachings of the invention. Obviously, devices may be provided which change, eliminate, or add certain specific details without departing from the scope of the invention.

What is claimed is:

1. A shock absorbing bumper unit for trailer hitches comprising a bumper with a towing-connector member fixed at the center thereof, bracket means for mounting said bumper on a vehicle frame, said bumper including draw bar means for transmitting forces between said towing-connector member and said bracket means, said bracket means comprising a pair of female bracket elements fixed to the frame rails at each side of said vehicle frame and a pair of male bracket elements fixed to said draw bar means on each side of said towing-connector member and partially penetrating said female bracket elements, draw rod means tied to each of said female bracket elements and extending from the tie point through the penetrating end of said male bracket element and lengthwise thereof to a rod end provided with sleeve retainer means, first resilient sleeve means surrounding said rod between said tie point and said penetrating end, second resilient sleeve means surrounding said rod between said penetrating end engaging opposite ends of said first and second sleeve means whereby, during the course of towing, the bumper together with the male bracket elements on each side thereof move back and forth with respect to the female bracket elements and the vehicle frame, alternately compressing the first and second resilient sleeve means associated with the bracket means at each side of the bumper.

2. A shock absorbing bumper unit as set forth in claim 1 wherein said resilient sleeve means are entrapped and completely enclosed within chamber means defined by said bracket means for confining the deformation of said resilient sleeve means upon relative movement of said bumper and male bracket elements with respect to said female bracket elements.

3. A shock absorbing bumper unit as set forth in claim 2 wherein each of said female bracket elements includes a hollow portion having a substantially rectangular cross section and each of said male bracket elements includes a penetrating portion comprising a channel having a rectangular, U-shaped cross section sized to be received in telescoping relationship within said hollow portion of said female bracket element, and said hollow portion and said penetrating portion cooperate to provide said chamber means.

4. A shock absorbing bumper unit as set forth in claim 1 wherein said draw bar means comprise a reinforcing member extending along said bumper and disposed substantially within the plane of said draw rod means, said male bracket members being connected to the adjacent ends of said reinforcing member, and said towing-connecting member being connected to said reinforcing member adjacent the center thereof.

5. A shock absorbing bumper unit as set forth in claim 1 wherein said resilient sleeve means comprise cylindrical, elastomeric tubes.

6. A shock absorbing bumper unit as set forth in claim 5 wherein said elastomeric tubes are formed of a urethane material.

7. A shock absorbing bumper unit adapted to be secured to the frame of a vehicle for use in towing trailers or the like comprising a bumper with towing-connector means disposed adjacent the center thereof, a pair of telescoping bracket assemblies adapted to be fixed to a vehicle frame at spaced locations on each side of said towing-connector means and to support said bumper in a transverse position across the rear width of the vehicle for longitudinal movement relative to the vehicle frame, each of said telescoping bracket assemblies including a female bracket element which provides a longitudinally extending housing for receiving a penetrating portion of an associated male bracket element and draw rod means connected between the associated bracket elements to provide relative, longitudinal movement therebetween, said draw rod means being tied to said female bracket element and extending from the tie point through the housing and a sleeve biasing wall provided by the male bracket element to sleeve retainer means disposed adjacent the end of said draw rod means spaced from said tie point, first resilient sleeve means surrounding said rod between the tie point and said sleeve biasing wall, second resilient sleeve means surrounding said rod between said sleeve biasing wall and said sleeve retainer means, said resilient sleeve means resisting said relative, longitudinal movement between associated bracket elements.

8. A shock absorbing bumper unit as set forth in claim 7 wherein said associated bracket elements cooperate to enclose said resilient sleeve means to confine the deformation thereof.

9. A shock absorbing bumper unit as set forth in claim 8 wherein said female bracket element is fixed to the vehicle frame and said male bracket element is connected to said bumper, and said bumper together with said male bracket elements longitudinally move back and forth with respect to the female bracket elements upon said relative, longitudinal movement between associated bracket elements.

10. A shock absorbing bumper unit as set forth in claim 8 wherein said resilient sleeve means comprise elastomeric tubes having a generally cylindrical configuration.

11. A shock absorbing bumper unit as set forth in claim 10 wherein said elastomeric tubes are formed of a urethane material.

12. A shock absorbing bumper unit as set forth in claim 10 wherein said elastomeric tubes include an internal bore corresponding in size with the outside dimension of the surrounded portions of said draw rod means.

* * * * *

UNITED STATES PATENT OFFICE
CERTIFICATE OF CORRECTION

PATENT NO. : 3,863,956
DATED : February 4, 1975
INVENTOR(S) : Shahid R. Khan

It is certified that error appears in the above-identified patent and that said Letters Patent are hereby corrected as shown below:

Column 7, line 16, after "end" add --and said sleeve retainer means, said penetrating end--.

Signed and sealed this 20th day of May 1975.

(SEAL)
Attest:

RUTH C. MASON
Attesting Officer

C. MARSHALL DANN
Commissioner of Patents
and Trademarks